Figure 1:
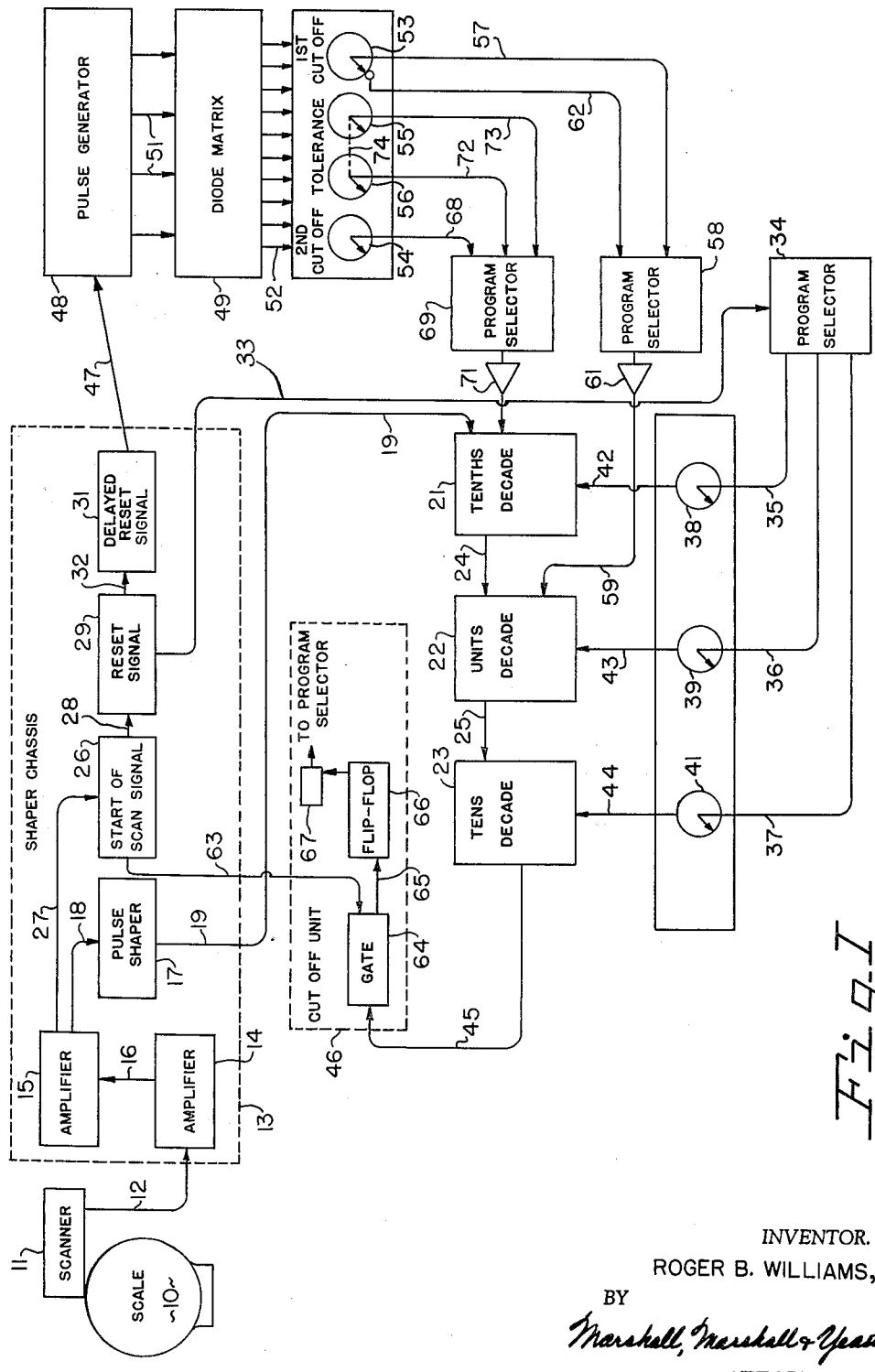

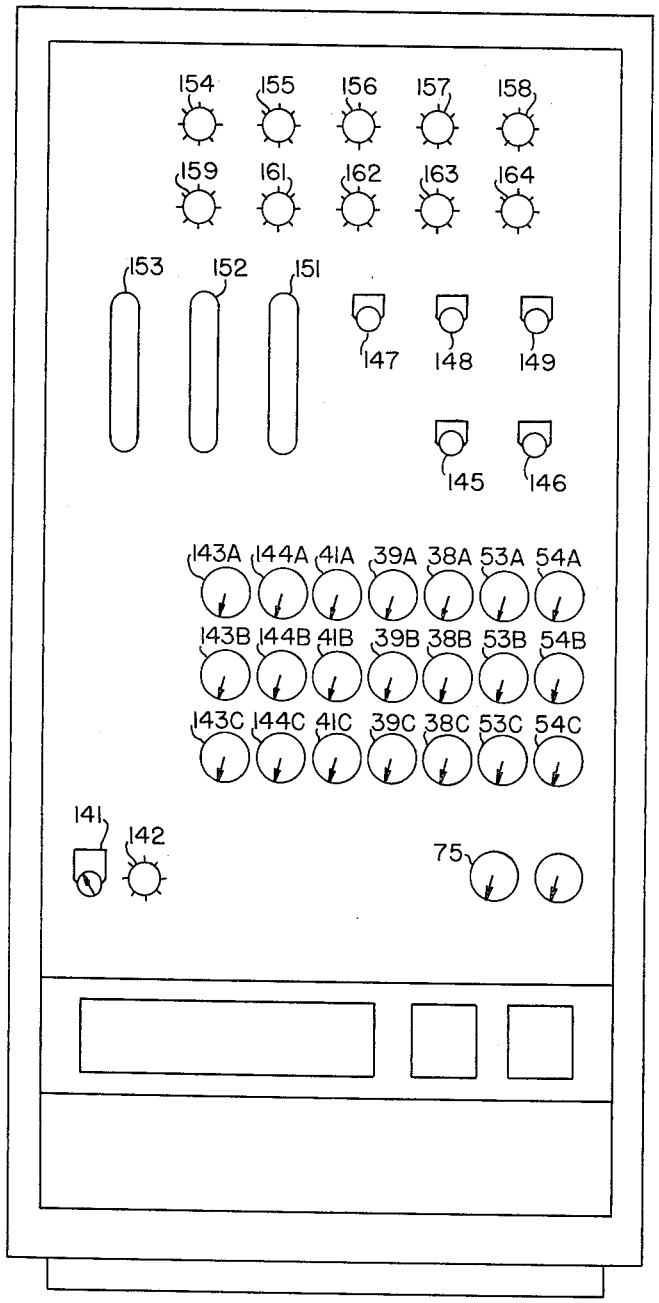
Fig. II
INVENTOR.
ROGER B. WILLIAMS, JR.

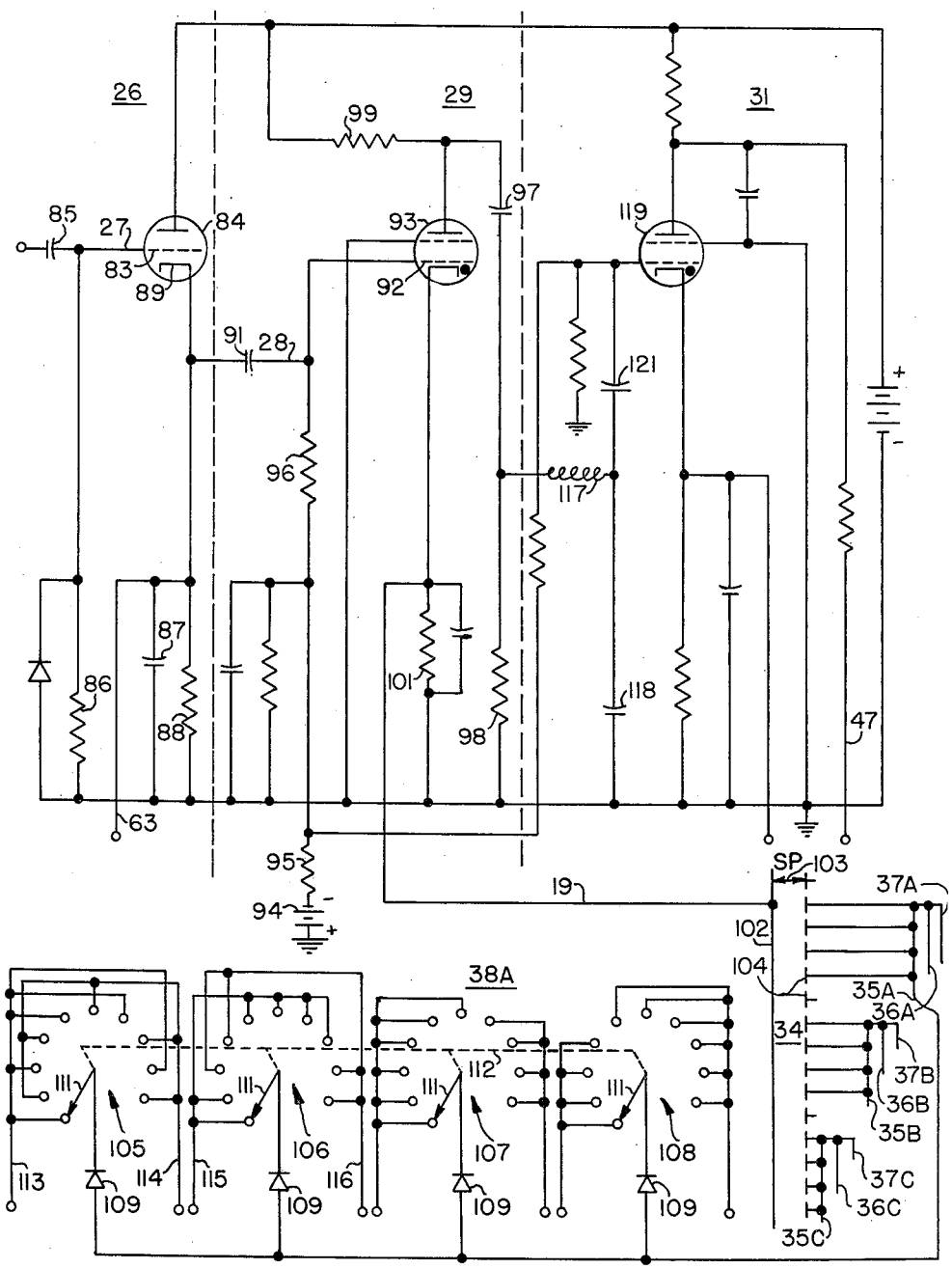
Fig. III

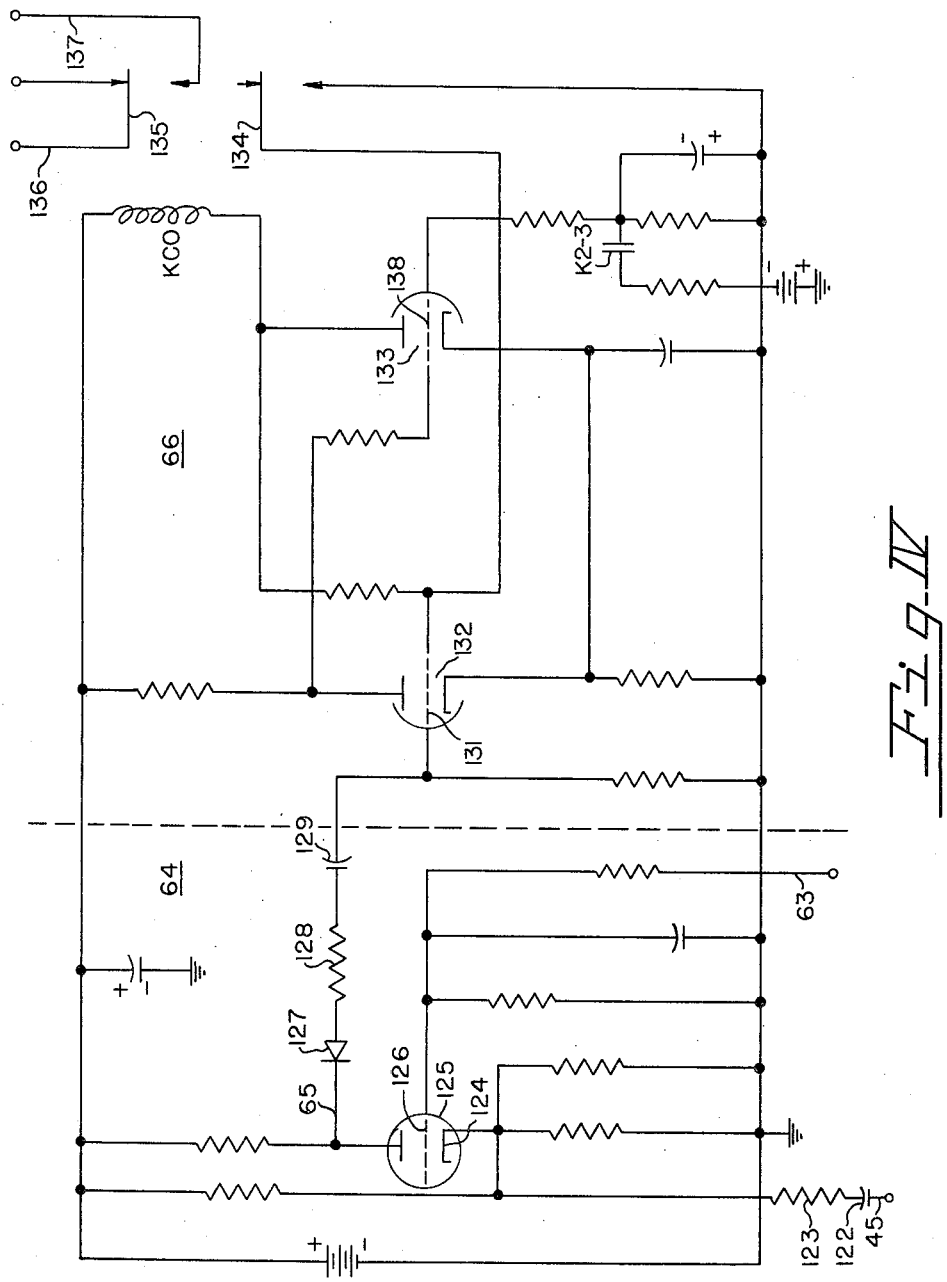
Fig. IV
INVENTOR.
ROGER B. WILLIAMS, JR.
BY
Marshall, Marshall & Yeating
ATTORNEYS

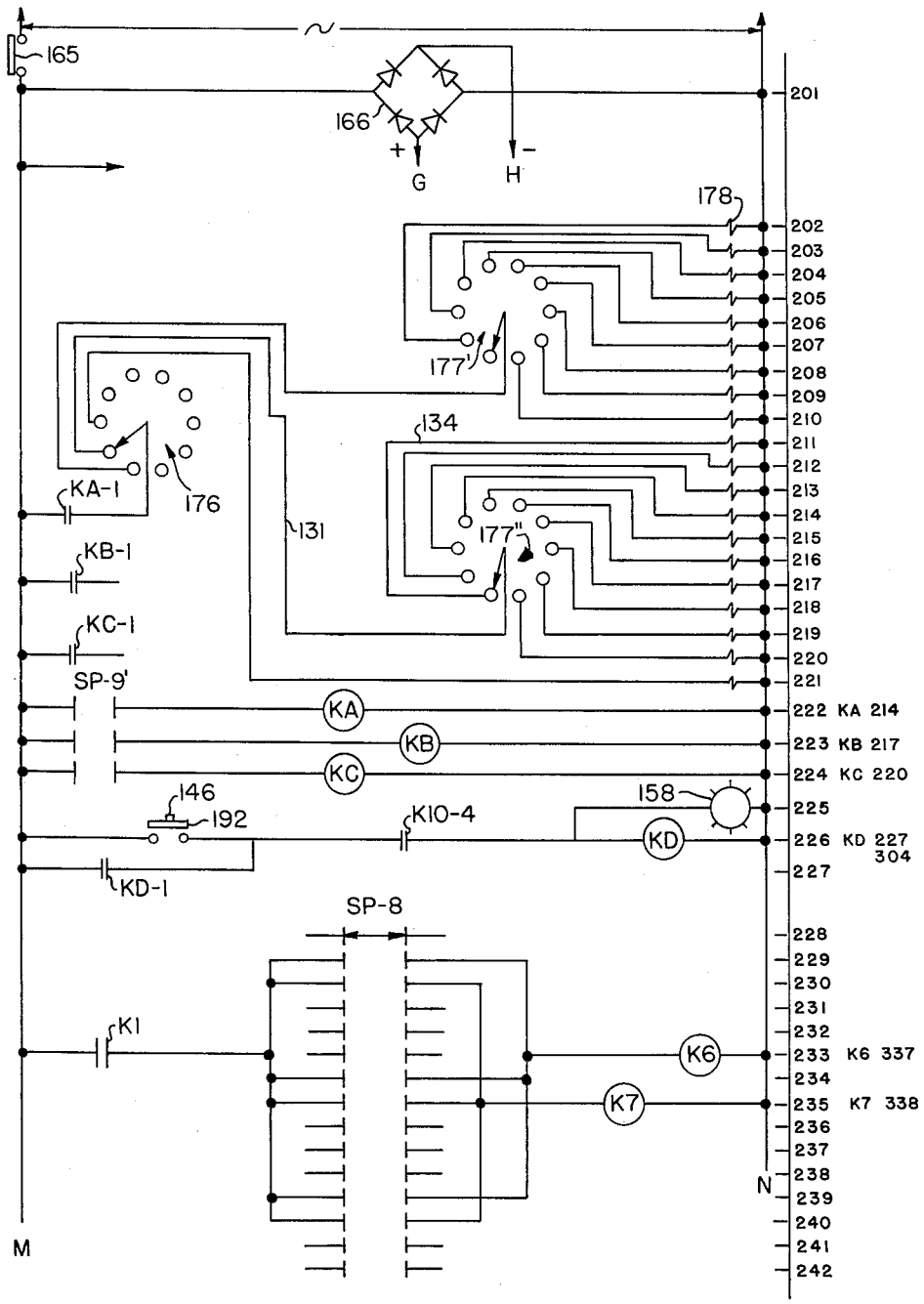
Fig. V

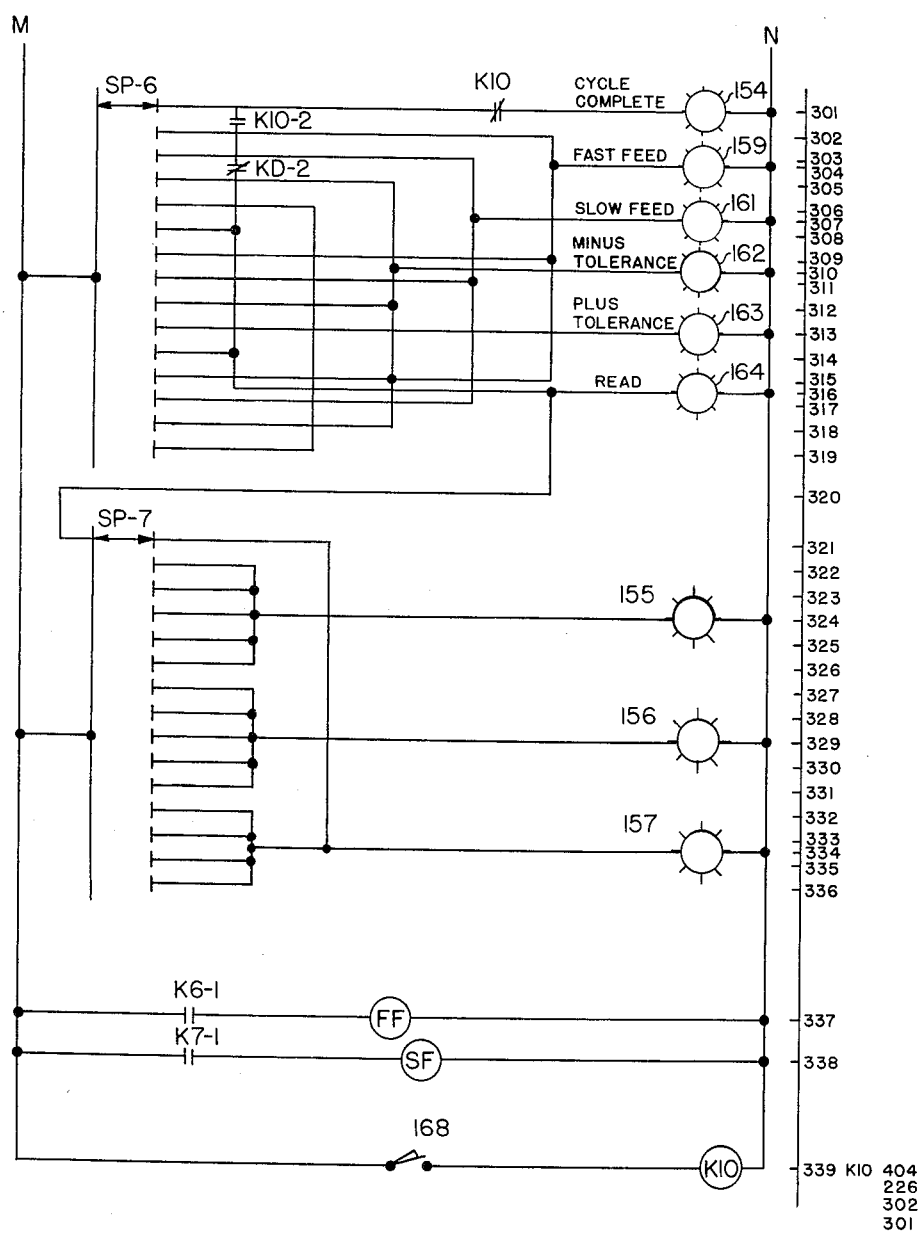
Fig. VI

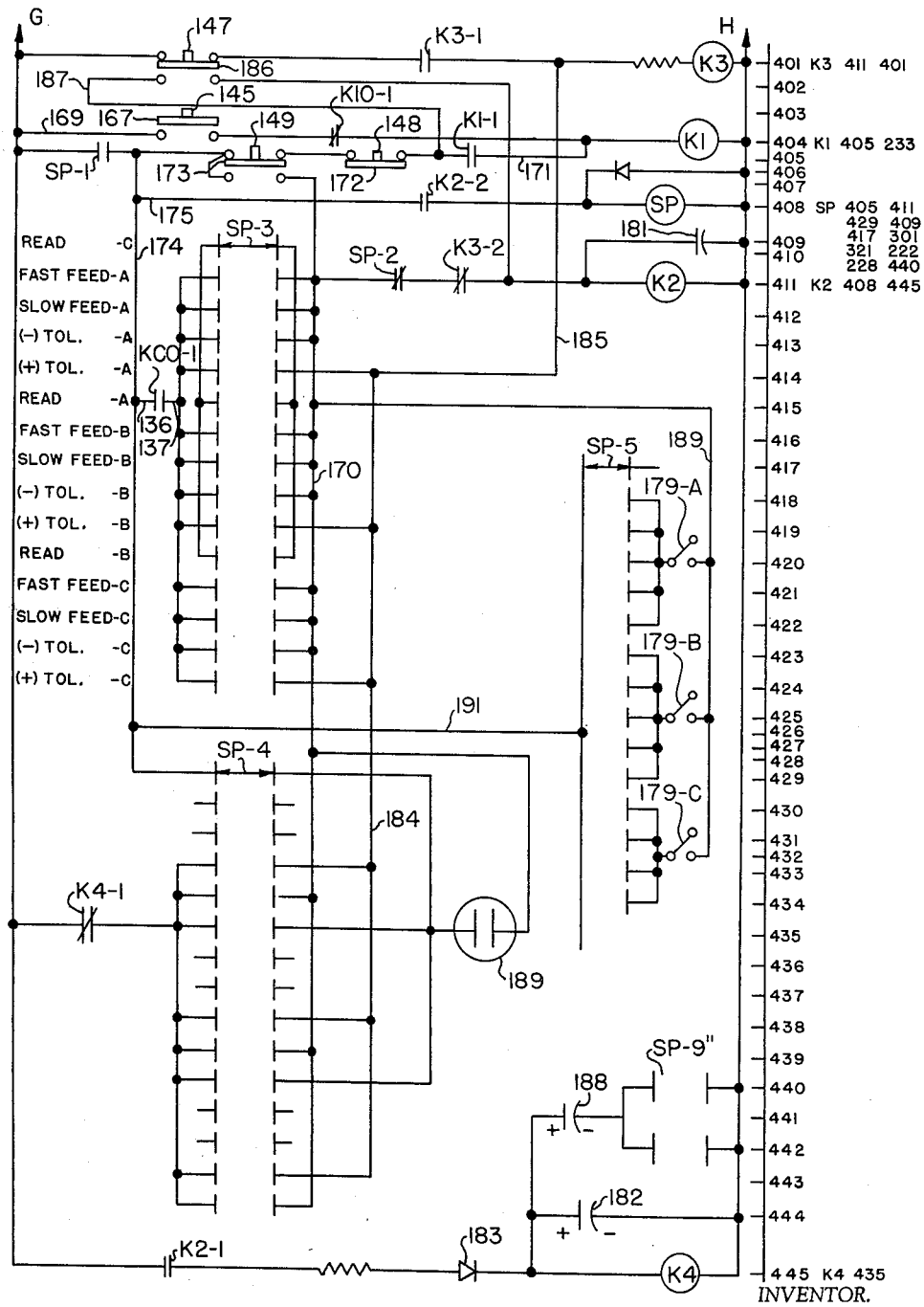
Fig. VII

United States Patent Office 3,035,648
Patented May 22, 1962

3,035,648
REMOTE SETTING DIGITAL WEIGHT
CUTOFF SYSTEM
Roger B. Williams, Jr., Toledo, Ohio, assignor to Toledo Scale Corporation, Toledo, Ohio, a corporation of Ohio
Filed Dec. 1, 1958, Ser. No. 777,323
18 Claims. (Cl. 177—70)

This invention relates to control systems and more particularly to an electrical control system for continuously monitoring a parameter and for actuating mechanism at critical values of said parameter.

One object of this invention is to accurately sense and respond to one or more values of a parameter critically related to a given value of that parameter.

Another object is to simplify the equipment required to ascertain a plurality of inter-related values or conditions.

A further object is to facilitate the automatic control of material feeding equipment.

An additional object is to check a quantity against tolerance limits automatically.

A specific object is to increase the flexibility and improve materials feeding systems having automatic weight controlled cutoffs and tolerance checks for one material or individually for a plurality of materials which are batched.

In accordance with the above objects one embodiment of the invention has been incorporated in a system for automatically combining accurately weighed quantities of material into a batch. Each material of the batch is fed individually to a weighing station. When a quantity which is a given amount less than the total required has been fed to the weighing station the feed speed is reduced and a further amount is accepted until the total has been fed. Plus and minus tolerances are then checked on the total and if correct a new material feed cycle including fast feed, slow feed and plus and minus tolerance checks is run.

The system includes a controller which schedules or programs automatically the sequence of operations controlling the feed of material and the steps of weighing that material in response to certain critical values of weight sensed. The program includes a weighing operation during an interval the feed is operated to admit material to the weighing station at a high rate. That weighing operation cuts off the feed at a given weight which is short of the total weight of the material which is sought to be fed and at that given weight initiates a slow feeding rate for the remaining material to be admitted to the weighing station. As the programming system is set to the slow feed rate the weighing system is set to sense the application to the weighing station of a second critical weight of mateiral closely approximating the ultimate weight sought. When that second weight is realized as sensed by the weighing system the programmer is again actuated to cut off all feed of material and to initiate the checks of the total weight for the lower and upper limits of deviation from the nominal weight. The programmer sets up the minus tolerance check by setting the weighing system to generate a signal when it senses a load applied to the weighing station in excess of the lower limit of weight. Upon generation of this signal the programmer sets the weighing system for the upper tolerance limit by altering the weighing system to issue a signal when the weight sensed at the weighing station by the system exceeds the upper limit. In the absence of such signal within a given interval the programmer is actuated again to advance and again recondition the weighing system, for example, to sense the weight at the weighing station as an absolute value and actuate readout mechanism. Programming can be terminated upon the completion of any of the aforenoted steps by suitable arrangement of the programming controls or it can be adapted to institute similar cycles for the addition of other material.

Digital control techniques are employed wherein the sensed weight values are represented by electrical pulses which are counted. The attainment of predetermined counts in the counting means actuate automatic controls which respond to the quantity being sensed. These controlling pulse counts differ by relatively small but critical pulse count values. Hence, several pulse train lengths can be measured which deviate from a given basic count the value of which is related to a single principal value of pulse count set into the counter. The deviations from that basic count or pulse train length which the counter is conditioned to sense by the single principal reset value can be established by setting secondary values of count or preset counts into the count means which are superimposed upon the single principal reset value. A primary feature is the use of a single principal reset pulse count value for each material being handled and a secondary reset pulse count to enable each critical value to be established at counts deviating by a predetermined number of pulses from the principal value. This is accomplished by accumulating electrical pulses in a counter as a function of the weight of the material which has been fed. In each operation the counter is reset to the complement of the principal value and a fixed interval thereafter a train of pulses are generated all prior to the application of weight pulses. A train of electrical pulses having a length as a function of weight is generated after the reset has been completed. These pulse trains are generated repetitively. Routing networks enable the generated reset pulses to be selectively applied to the reset counter decades to adjust their initial count by a predetermined amount from the principal value. For example if a weight of 55 pounds were to be fed, if the flow rate of that material were such that the high speed feed should be cut off when a quantity 6 pounds less than the desired quantity had been fed in order to enable feeding to be controlled accurately by a low feed speed, if the gate admitting it to the weighing station were so spaced therefrom that at low feed speeds 0.3 pound of material is applied after feed is stopped, and if a plus and minus tolerance of 0.2 pound were permissible, a counter which counts out at 99.9 is initially reset to 44.9, the complement of 55.0 on a basis of 999 (99.9—55.0=44.9) and is varied from that value by additional adjustment of the count. Thus, during high speed feed, the counter is reset to 44.9 and then 6 additional counts are applied to the units decade to cause it to count out when 49 pounds have been applied (99.9—[44.9+6]=49). When it counts out the programming is advanced, a low rate of feed is initiated, the counter is reset to 44.9, and a count of three is inserted in the tenths decade so that the counter counts out and all feeding is terminated when 54.7 pounds have been applied (99.9—[44.9+0.3]=54.7). The additional 0.3 pound in transit from the gate to the weighing station when received brings the weight up to 55 pounds. When the counter counts out during the low speed feed and the flow of material has been stopped, the program is advanced and the minus tolerance check is initiated. The program control automatically introduces the several control conditions for the feeding and weighing of material. During the feeding intervals the reset and preset values are introduced automatically each time a weighing is initiated. Since the weighing is performed repetitively during each feeding operation, the counters are repetitively reset and adjusted from the reset value upon issuance of a preset signal.

Minus tolerance is checked by a cycle wherein the counter is reset to the complement of the nominal weight and then pulses are admitted to the tenths decade according to the tolerance, e.g. two pulses for an 0.2 pound minus tolerance, so that a weight pulse train representative of a weight within at least 0.2 pound of the nominal weight will cause the counter to count out and the programming to be automatically advanced.

The load is then checked for plus tolerance. This requires a subtraction in the complement of the nominal weight. One technique of effecting such subtraction according to the present invention is to generate a weight pulse train representative of a weight less than that actually imposed by at least the maximum tolerance. Advantageously, a weight train one pound light can be employed where tolerances are to be less than a pound. In such an arrangement on each of the fast feed, slow feed, minus tolerance and, if employed, readout steps this short weight is overcome by adding a count to the units decade during the reset operation. On the plus tolerance check this extra pulse is not inserted and instead a number of pulses which is the complement of the plus tolerance is inserted in the tenths decade. Thus, for a plus tolerance of 0.2 seven pulses are inserted in the tenths decade so that the counter will count out at 55.3 pounds in the example. A timer is activated during the plus tolerance check to advance the programing if a weight in excess of the plug tolerance is not exceeded within a predetermined interval.

The readout cycle can then follow, the counters being corrected to true weight by the addition of one pulse to the unit decade without resetting to a complement of the nominal weight. Upon completion of the five steps for the first material the program stepper advances through similar cycles for the second and third materials, stopping only if the fed material falls outside of the tolerances.

A particularly advantageous feature of the above outlined system is the reduction in the number of selection circuits for resetting the counter since it is reset to the complement of the nominal value of the material under consideration and adjusted selectively from that value.

Another feature is the sequencing of a first reset operation followed by a second reset operation or adjustment prior to the initiation of each pulse train.

A further feature is the subtracting technique wherein a pulse train which is fed into a counter is shortened by a predetermined amount and the abbreviation in train length is compensated for selectively in the reset operation, wherein the complement of a predetermined pulse train length is inserted in the counter, either completely where no subtraction is necessary or partially to the extent required in the subtraction process.

The above and additional objects and features of this invention will be appreciated more fully from the following detailed description of the invention when read with reference to the accompanying drawings wherein:

FIG. I is a block diagram of a weight responsive automatic batching system including a digital readout, automatic programming means and control means according to this invention;

FIG. II is a front view of a control cabinet for the automatic batching system of FIG. I;

FIG. III is a schematic diagram of the reset impulse generating circuit and one reset selection switch for one decade and one material of the system of FIG. I;

FIG. IV is a schematic diagram of the counter responsive cutoff circuit of FIG. I;

FIGS. V and VI are across the line diagrams of portions of the control circuits of FIG. I which are energized by alternating current;

FIG. VII is an across the line diagram of a portion of the control circuits of FIG. I which are energized by direct current.

In order to facilitate the disclosure of the inventive aspects of this batching system it has been materially reduced in complexity from the form actually employed. Thus only one scale is illustrated although two or more can be employed and suitable scale selection switches and controls incorporated to supply information to the automatic control elements from the selected scale. The automatic features of the system are shown and the manual features have been deleted. Only twenty materials are indicated to be available for feeding as material A although many more can readily be fed. No duplication of circuits similar to those controlling the feed of material A are shown for the other materials such as materials B and C and the program and controls have been illustrated for automatic compounding of a batch of no greater than three materials even though greater numbers could readily be incorporated by a simple extension of the illustrated equipment.

The system is illustrated as effective for a weight capacity within the range of the indicator dial. However, it is to be appreciated that the weight capacity can be expanded to many times the dial range by the use of unit weights and the incorporation of appropriate settings in the counter and control circuits.

Across the line diagrams as shown in FIGS. V through VII have been provided with marginal keys for convenience in correlating actuating coils and contacts controlled thereby. In these keys as appears on the right side of the diagrams each horizontal line of the circuits has been numbered. The numbered lines are employed to index the circuit elements so that the column to the right of the column of line numbers contains the symbol of the relay coil appearing in that line and the location of the contacts actuated when that relay coil is effective is indicated by a series of line numbers in the column to the right of the relay symbol column. As a further aid in appreciating the invention all relay contacts are shown in the condition they assume while their actuating coils are deenergized and back contacts, those which are closed when their actuating coil is deenergized and are opened by energization of that coil, are delineated by having the location line numbers underlined in the marginal key while front contacts, those normally open and closed by their energized actuating coil, do not have their index numbers underlined.

An important element of the control circuits is a program stepper which in practice has been a rotary stepping switch having twelve decks and a contact arm for each deck which successively makes and breaks circuits as it is stepped from one position to another. The stepper is driven by a ratchet which is spring biased, and is cocked against the spring pressure by energizing an actuating coil SP of FIG. VII. Each cycle of this stepper involves traversing 15 positions. Certain of the program selector decks have been illustrated as parallel spaced contacts arranged vertically. In each instance where an entire deck is illustrated in a single parallel pair of contact groups a line having an arrowhead at each end is shown extending between a parallel pair of contacts. The arrowheaded line is shown in the home position. It is to be understood that as the program stepper advances each arrowheaded line advances one step downward to bridge a new contact pair and disconnect the preceding pair. In certain instances the decks have been broken up in the diagrams. Such partial decks will be identified with the remainder of their contacts, if shown, in the body of the following detailed disclosure.

The purpose of the system of FIG. I illustrating one utilization of the invention is to automatically batch three materials from a number of available materials, weight the materials and check each material in the batch against a control tolerance. Fast and slow or dribble feeds with individual settings for each material are available. The control functions apart from material selection are represented in FIG. I and the control means as they appear on a control panel are shown in FIG. II. The system weights material fed to a load receiver on scale 10, reads the weight indicated by the scale as a train of pulses emanating from an optical scanner, a photoelectric translator, and preamplifier 11, and feeds the resultant electrical pulses to the control circuits over lead 12 to a shaper chassis 13.

Shaper chassis 13 includes a first and second pulse amplifier 14 and 15 interconnected by a lead 16 which transmits the amplified pulses. A pulse shaper 17 receives those pulses over lead 18 and converts the relatively slow rise time signals into fast rise time unidirectional pulses of fixed amplitude suitable for feeding over lead 19 to the tenths, units and tens decades 21, 22 and 23 of the counter which are serially connected by leads 24 and 25. Weighing is performed at a repetition rate sufficient to provide at least two indications of weight between each change of weight amounting to one graduation of the scale indicator. In order to achieve this the optical scanner is driven at a speed producing 20 weight scans per second in the exemplary embodiment and the pulse rate within each pulse train is about 70,000 pulses per second.

The initiation of each scan is indicated by a pulse generated in the scanner 11 ahead of the first weight pulse and transmitted through amplifiers 14 and 15 to the start of scan signal generator 26 over lead 27. This start pulse generates a positive pulse in start signal generator 26 which persists throughout the following pulse train. The rising front of that pulse as fed over lead 28 to a reset signal generator 29 produces a spiked pulse having a sharp front which is employed to reset the counter decades 21, 22 and 23 and to trigger a second spiked pulse in a delayed reset signal generator 31 coupled thereto through lead 32. The reset signal emanating from generator 29 over lead 33 is programed through program selector section 34 and fed over one conductor of each of the three cables 35, 36 and 37 to reset selector switches 38, 39 and 41 for the particular material being programed at that time. Thus, selector switches 38, 39 and 41 are illustrative of those for but one material and in practice a reset selector switch is provided for each decade of the counter and each material so that nine switches are employed. The control knobs for these switches are illustrated in FIG. II where the suffixes indicate the materials to which they apply, as 38A is the reset switch for the tenths decade and material A. Switches 38, 39 and 41 each have ten positions and are coupled from respective positions to corresponding reset connections in the decade counter by means of cables 42, 43 and 44 respectively so that the setting of switch 39 for material A at 7 as where seven pounds of material A is to be incorporated in the batch causes the complement of seven, two pulses, to be set in that units stage of the counter, e.g. (9−7=2). In this manner when seventy weight pulses have been counted seven pulses will have been transmitted to the units decade and the eighth pulse will cause it to count out. Similarly the other decades can be set to the complement of the weight value desired.

In the present system three materials can be accumulated in a single batch, hence the reset values are representative of the cumulative weight. If materials A, B and C are added in order and material A is 17.5 pounds, material B is 25.2 pounds and material C is 32.1 pounds, the reset value for A is 17.5 and the counters are actually reset to the complement, 82.4, the reset value for B is 42.7 or the sum of A and B and the counters are actually reset to 57.2 and the reset value for C is 74.8. These reset values will be referred to as the nominal reset value since they are the nominal or ultimate weight objectives to be realized.

A number of weighing objectives closely related to but differing slightly from the nominal weight of each material are required in controlling the fast feed cutoff point and the dribble feed cutoff point and in checking the tolerances. Thus the fast feed should be cut off a few pounds ahead of the nominal weight. Since material which has passed the gate or valve but has not reached the weighing station ultimately reaches that station, that material being known as the "preact," the slow speed cutoff should also be effected before the nominal weight is applied so that the final weight is the nominal weight. The check of the negative tolerance also requires the control to respond to some weight less than the nominal weight while a check of the positive tolerance is arranged to indicate that the material does not exceed the nominal weight by more than a predetermined amount. These deviations from nominal weight are achieved by adding to or subtracting from the complement of the nominal weight. Addition is effected by arranging the scanner 11 so that it generates fewer weight pulses than are representative of the actual weight, conveniently ten fewer pulses, whereby the scanner must respond to greater than the actual weight to generate the number of pulses corresponding to that weight. Subtraction is accomplished by adding to the nominal reset.

Each of the several subcycles is instituted by a program selector. Each fast feed, slow feed and minus tolerance check is terminated by the counting out of the counter to advance the program selector. Each plus tolerance check is terminated when the counter fails to count out in a given time interval. At the end of that interval the timer advances the program selector. Thus in the case of the termination of fast feed and the institution of dribble feed the counters are arranged to count out and issue a pulse over lead 45 to the cutoff unit 46 at some weight below the nominal weight by resetting the counter to the complement of the nominal value and then effecting a further adjustment of that reset level e.g. if fast feed cutoff should occur for material A at 13.5 pounds or 4 pounds less than the nominal weight, four additional pulses are inserted into the units decade 22 of the counter to set it at the complement of 13.5 pounds. Further, since the counter will register one pound light due to the failure of the scanner to generate the signals for the first pound the counter is set ahead one pound by the insertion of a pulse in the units decade 22 on all subcycles but the plus tolerance check. These additional pulses are inserted subsequent to the reset pulse and prior to the first weight pulse.

The reset pulse generated at 29 triggers delayed reset pulse generator 31 over lead 32 to issue a second spiked pulse which adds the appropriate pulses to the counters before the first weight pulse is generated. This single pulse is passed over lead 47 and triggers a pulse generator 48 in the form of blocking oscillators connected in cascade to produce ten output pulses. Various combinations of the pulses may be selected for the reset adjustments. The pulses are fed to a diode matrix 49 over leads 51 from the several blocking oscillators and are separated into individual pulses in that matrix. Ten leads 52 pass the individual pulses to appropriate terminals on ten position selector switches 53, 54, 55 and 56 for the first cut off reset deviation, second cutoff reset deviation, and the plus and minus tolerance deviations from the nominal weight. Each of these cutoff switches 53 and 54 can be set selectively to appropriate levels for the material it controls and each is duplicated for materials A, B and C as best seen in FIG. II. Thus, if a fast feed cutoff is to occur at 13.5 pounds, four pulses from generator 48 are routed through switch 53, lead 57 and program selector 58 to the units decade 22 through lead 59 and amplifier 61. An additional pulse from pulse generator 48 is routed through the first connection on the first cutoff switch 53 and a fixed lead 62 to program selector 58 and thence to the units decade to compensate for the short train from the scanner. This additional pulse is applied by means of the program selector to all subcycles except the plus tolerance subcycles for materials A, B and C.

Once the first cutoff weight is applied, the counter counts out and imposes a pulse over lead 45 to cutoff unit 46. This pulse is utilized to actuate a relay closure which programs the control unit if a pulse is issued from the start of scan signal generator 26 over lead 63 to actuate coincidence gate 64. This assures that the program will not be advanced in response to a spurious signal on lead 45 as the true cutoff signal should occur only during the scanning time. The gated cutoff signal is passed over lead 65 to a relay energizing circuit 66 in the form of a flip flop which energizes a relay 67 and holds it energized until a deenergizing signal is generated. The advance of the program selector in response to relay 67 effects deenergization of the relay 67.

The next subcycle is the dribble feed which is terminated by the second cutoff. As noted an unweighed quantity, the preact, must be accounted for in this step. This preact is of the order of tenths of pounds. Accordingly, from one to nine pulses are fed to the tenths decade 21 from second cutoff selector 54 as determined by the setting of that selector. The pulses are generated in 48 after the counter has been reset to the complement of the nominal weight and are routed through selector 54 to cable 68 and thence to a program selector section 69 which connects the appropriate second cutoff lead of that cable to amplifier 71 feeding the pulses to tenths decade 21. Further reset is accomplished by applying a pulse over lead 62 to the units decade to compensate for the ten short pulses of the scanner at this time.

When the counter counts out, the gate through which the material is admitted is closed and the cutoff unit is again actuated to advance the program selector and initiate the minus tolerance subcycle.

Minus tolerance is checked by presetting into the tenths decade 21 from 0 to 9 counts depending on the tolerance setting on switch 56, and by determining that the counter fills up to give a cutoff signal. This indicates that the weight on the scale is at least as much as the nominal weight less the few tenths of a pound set into the tolerance switch. Minus tolerance pulses are routed through switch 56, thence lead 72, program selector 69, and amplifier 71. A single pulse is added over lead 62 and through program selector 58 to the units decade 22 to compensate for the short weight pulse train as outlined above for the fast and dribble feed subcycles.

Subtraction of the value set in the plus tolerance selector 55 from the complement of the nominal weight is necessary in order to set an upper weight limit which will not be attained if the applied weight is within tolerances. The short weight pulse train enables such subtraction and is rendered effective in the plus tolerance check subcycle by imposing no compensating pulse over lead 62 to the units decade. Instead the complement of the plus tolerance is imposed on the tenths decade of the counter as the delayed reset. Thus if the upper limit of weight for material A is 17.8 pounds or 0.3 pound greater than the nominal weight the plus tolerance selector 55 imposes the complement of 0.3 pound or 6 pulses on the tenths decade 21 through lead 73, program selector 69 and amplifier 71. The counter thereby is effectively set at the complement of 17.5 pounds or 824 at the completion of the nominal reset and at 830 or the complement of 16.9 at the completion of the delayed reset adjustment. Since the scanner is ten pulses short of the actual weight, 169 pulses are generated by a weight of 17.9 pounds or a weight 0.1 pound over the plus tolerance. Thus the counter will count out if the weight exceeds the plus tolerance. As will be discussed in detail, if the counter counts out on the plus tolerance subcycle the program selector will not advance and an indication of a faulty operation will be given.

Plus and minus tolerances can be selected independently as described. However, in practice it has been found advantageous to employ a single tolerance control for each material and like plus and minus tolerance levels. This is accomplished by interconnecting the selector arms as represented by the broken line 74 of FIG. I and by means of a single selector knob 75 on the face of the control cabinet of FIG. II. A tolerance of 0.3 pound is thus established by feeding 3 pulses from generator 48 to tenths decade 21 during the minus tolerance subcycle and the complement of 3 or 6 pulses during the plus tolerance subcycle.

A fifth subcycle, a weight readout, can be incorporated in the programed batching of each material. Such a readout can be in the form of a display as by means of illuminated numbers or the positioning of indicator wheels at a location remote from the scale head, or in the form of a recording operation as by punching a tape or card with the coded weight or by printing the weight. In any of these readout operations it is desirable that the control system be maintained quiescent an interval sufficient to enable the readout to be completed. The present system has not been disclosed with a readout mechanism. If such a subcycle were to be incorporated in program selector 34 could be arranged to pass the reset signal from 29 around the reset selectors 38, 39 and 41 so that the tenths and tens decades would be preset to zero and the units decade would be set to one at the beginning of each scan. Further the readout would be enabled only at the end of the scan as can be indicated by the end of the pulse generated in 26. At the end of the readout operation or after a given interval in the case of a visual readout the program stepper advances to the next material.

The weighing scale 10 which, for example, can have a 120 pound dial capacity is provided with a photoelectric readout device 11 producing a pulse for each tenth pound indicated on the dial after the first pound. A combination scale head and readout of one type suitable for the present invention is shown in the copending United States patent application of Clarence E. Adler, Serial No. 553,457 which was filed December 16, 1955 now Patent No. 2,938,126 and is entitled Indicator Scanning Device. The scanner consists of a light source, a chart, a shutter, an optical magnification system, a photocell and an electronic amplifier, none of which are shown. The chart is opaque and is provided with one thousand translucent lines so spaced that the shutter which is mechanically coupled to the weighing scale indicator uncovers one line for each tenth pound indicated by the scale after the first pound. When the scale dial reads zero, the shutter covers the weight lines of the chart. When the dial indicates a weight, the number of lines uncovered by the shutter is the scale reading minus ten. An extra line is marked on the chart about twenty graduations distance ahead of the first weight line. This mark generates the impulse used in the reset circuits.

Electrical weight pulses are generated by repetitively scanning the portion of the chart which is not covered by the shutter. Scanning is accomplished by a rotating optical system which projects an image as formed by the light source behind the chart onto a photoelectric cell. As the optical system rotates, images of distinct lines of the chart pass the photocell where they are converted to electric pulses.

The preamplifier associated with scanner 11 consists of a cathode follower triode amplifier. The signal from the photocell is a positive pedestal voltage with pulses representing weight increments superimposed. It is coupled through a condenser to the grid of a tuned plate amplifier in a manner such that the coupling forms a high pass or differentiating network to remove the pedestal voltage. The pulse signals are then fed to the cathode follower which provides a low source impedance for driving long lengths of shielded cable 12 feeding the shaper 13.

In the shaper the signals are amplified in a double triode voltage amplifier having substantial gain. Output signals from the triode are coupled capacitatively to a pulse shaping circuit 17 in the form of a blocking oscillator. In this circuit, the relatively slow rise time signals from the amplifier are converted into fast rise time unidirectional pulses suitable for electronic counters. The blocking oscillator is of conventional form as are the amplifier and preamplifier.

The blocking oscillator is normally non-conducting and is transferred to a conductive state by the usual highly regenerative loop therein until the tube becomes saturated at which time the reverse action occurs and a sharp drop in grid potential re-establishes the non-conducting state. The output pulses from the plate of the tube in the blocking oscillator circuit are sharp negative going pedestals with a rise time of the order of one microsecond and a width determined by the blocking oscillator transformer.

The positive pulses from the double triode amplifier are also coupled over lead 27 as shown in FIG. III to grid 83 of triode 84 in the start of scan signal generator 26. This coupling is through condenser 85 and resistor 86. Signal generator 26 provides positive signals at the leading edges of the train of positive count pulses. These positive signals cause triode 84 to conduct. As current flows through 84, condenser 87 is charged to a new potential by the voltage drop in resistor 88. In between the pulses condenser 87 discharges slowly through resistor 88. The plate resistance of triode 84 is small so that condenser 87 is nearly fully charged between pulses and resistor 88 holds that charge between pulses so that a rise in potential occurs on lead 63 at the first pulse of a train. That potential level is maintained until a short interval after the last pulse of a train. During the interval this increased potential is imposed on lead 63 and gate 64 of the cutoff unit is enabled.

The initial pulse in each scan cycle, that occurring prior to the first weight pulse, causes a positive pulse to be coupled from the cathode 89 of triode 84 via condenser 91 and lead 28 to the control grid 92 of thyratron 93 in the reset signal generating circuit 29. Tube 93 is normally biased non-conducting by source 94 and the voltage divider action of resistors 95 and 96. The positive pulse on grid 92 fires tube 93 and causes condenser 97, which is initially charged to the plate potential through resistors 98 and 99 while the tube is non-conducting, to discharge rapidly through the tube and cathode resistor 101 since the resistance of this path is very low. The result is a positive reset pulse of about twenty microseconds duration across resistor 101. This voltage pulse is transmitted over lead 19 to the parallel connected contacts 102 of a section 34 of the program selector from which they are routed by brush 103 to one of the individual program selector contacts 104 connected to the reset selector switches, for example, by leads 35, 36 and 37.

One reset selector switch is shown. For illustration purposes consider it to be the tenths decade reset counter for material A, identified as 38A. This reset selector is provided with four decks 105, 106, 107 and 108, one deck for each of the four flip flops in the counter decade. Detailed circuits of the counter decades have not been illustrated since they are conventional as disclosed in the United States patent application of Robert E. Bell and Roger B. Williams, Jr., Serial No. 657,942 filed May 8, 1957 now Patent No. 2,881,673 and entitled Load Measuring Apparatus with the exception that the reset circuits are individually interconnected to the selector switch decks shown in FIG. III to enable any count from 0 to 9 to be reset therein. Each reset pulse is routed by the position of program selector contact 103 so that in the second through fifth steps of the program when material A is subject to fast feed, dribble feed, minus tolerance and plus tolerance the A reset selectors 38A, 39A and 41A are pulsed to reset the counter decades to the values selected for material A. On the material A readout or sixth step of the programer 34, contact 104 has no circuit and the counter counts from a zero count without any additional reset. On the seventh through tenth steps the B material is fed and checked with an appropriate reset to the complement of the sum of A and B. The eleventh step corresponds to the sixth and no reset other than to zero is required for the readout of the cumulative A and B material weight. The twelfth through fifteenth steps require a reset for the complement of the sum of weights for materials A, B and C while it is fed and checked. The next step is to the first position where total weight can be readout, the scale cleared of that batch and prepared for the following batch.

In passing reset pulses to the counters leads 35, 36 and 37 are pulsed simultaneously. Each of the nine reset selectors is arranged as illustrated for selector 38A. The pulse passes through isolating rectifiers 109 to the movable contact arms 111 of each of the four decks. All of the contact arms are driven from a common arm represented by broken line 112. Each deck feeds two output leads which are connected to the reset terminals of a stage of the counter decade. Thus, deck 105 controls the reset of the first flip flop stage over leads 113 and 114 so that any even number reset pulses one side of the flip flop (the left side in the exemplary counter of the Bell et al. application) and any odd number reset pulses the other side of the flip flop. Similarly, leads 115 and 116 are connected to the second flip flop of the decade and so on. Three decks, one for each material are connected to each stage of a counter decade but no feedback or intercoupling is experienced as through the unused stages since the rectifiers 109 block such signals.

The second phase of the reset operation is effected by a signal generated in the delayed reset signal circuit 31. This signal is produced a given time delay following the reset signal. Incidental to the generation of the reset signal by the discharge of condenser 97 through tube 92 a negative pulse is generated across resistor 98. This negative pulse is coupled through the delay network of inductance 117 and condenser 118. An overdamped signal which can have a period according to the lead of the start scan signal over the first pulse of the weight train results. In one embodiment a period of about 20 microseconds has been employed to advantage. The first positive cycle of this signal fires thyratron 119 through condenser 121 to generate a spiked pulse similar to that issuing from tube 93. This pulse is used to drive a pulse generator 48 through lead 47.

Pulse generator 48 produces ten output pulses for each input pulse. It consists of a chain of cascaded blocking oscillators the details of which are not a part of this invention. Four output leads 51 transmit the pulses to a diode matrix from which there are nine output leads 52 each transmitting a given number of pulses from one to nine. These leads are connected to selector switch contacts of the cutoff and tolerance selectors 53, 54, 55 and 56. One form of the above combination of a pulse generator diode matrix and selector switches is shown in FIG. III of United States patent application Serial No. 585,787 filed May 18, 1956 now Patent No. 2,970,269 for Roger B. Williams, Jr. and entitled "Pulse Generator."

The first and second cutoff and the minus tolerance selector switches are each arranged with ten position from 0 to 9. Each position except zero is connected to a lead 52 transmitting a corresponding number of pulses, e.g. position #1 receives one pulse and position #5 receives five pulses. The contact arms of these switches pick up the number of pulses corresponding to their position and pass them on to the appropriate positions on the program selector sections 69 and 58. Thus at position number two of the program stepper the first cutoff setting on lead 57A is connected to decade 22 through selector section 58 and an additional pulse is fed thereto over lead 62. At the third position a selector section 58 only passes the single pulse on lead 62 and the 2nd cutoff setting of 54A is passed over lead 68A to the third position of selector section 69 and thence to decade 21. The fourth position of the program selectors connects the single pulse lead 62 to decade 22 through 58 and the selected minus tolerance of 56A through 72A and 69 to decade 21.

The plus tolerance eliminates the compensating pulse on lead 62 by disconnecting that lead from decade 22 when program selector section 58 is on the fifth position. Plus tolerance selector has its contacts connected to leads 52 having a number of pulses which are the complement of the selector contact positions, e.g. at the zero position nine pulses are picked up and at position #3 six pulses are picked up. Program selector section 69 at the fifth position connects 55A to decade 21 through 73A.

As the program selector sections 58 and 69 are advanced through the seventh through tenth and twelfth through fifteenth steps similar sequences are followed for materials B and C except that the elements with letter suffixes A are replaced by those with suffixes B and C respectively.

For the moment pass from the detailed programing of the system and the resetting variations incidental thereto and consider the details of the cutoff unit 46. The ultimate objective in the control function of each subcycle is either to energize a cutoff relay, or on the plus tolerance check cycle only, to avoid such energization for a given interval. Such energization results from a signal being issued to 67 of FIG. I which is a cutoff relay KCO shown in FIG. IV. When the counter changes from 999 to zero a negative pulse issues over lead 45 to gate 64 and is coupled through condenser 122 and resistor 123 to the cathode 124 of triode 125. If at the same time a plus scan signal is being received over lead 63 from start of scan signal generator 26 to raise the potential of control grid 126 of triode 125, the tube will conduct and pass a negative pulse over lead 65 and through rectifier 127, resistor 128 and condenser 129. This gating is done to insure against accepting a noise pulse for the true cutoff signal as the cutoff signal should occur only during the scanning time. The cutoff signal is thus coupled to the control grid 131 of triode 132 which is one half of a bi-stable multivibrator 66 including triode 133. Multivibrator 66 operates control relay KCO. When relay KCO pulls in it grounds contact 134 to hold triode 132 biased off and thereby seal itself in. It also closes contact 135 between leads 136 and 137 to enable the program selector to advance as illustrated in FIG. VII. Relay KCO is reset by the closure of contact K2-3, as an incident to the advance of the program selector as will be described, to connect a negative bias sufficient to return triode 133 to the non-conducting state to the control grid 138 of that triode.

The sequencing circuits are shown in FIGS. V, VI and VII. External controls for many of these circuits appear on the control panel of FIG. II. These external controls include a power switch knob 141 and pilot lamp 142, tens and units material selector switch knobs 143 and 144 for each of materials A, B and C, a start push button 145, a discharge push button 146, an advance push button 147, a stop push button 148 and a reset push button 149. Indicators are displayed on the control panel to set forth the current state of the control and afford a visual display of the count in the decades. Neon lamp indicators reading from zero through nine are arranged in vertical columns for each of the tenths, units, and tens decades at 151, 152 and 153 respectively to provide a visual readout of the count. Lamps are illuminated to signify completion of a batching cycle 154, the feeding of materials A, B or C, 155, 156 or 157 respectively, discharge of material from the weighing station 158, and the five subcycles for each material, viz. fast feed 159, slow feed 161, minus tolerance 162, plus tolerance 163 and readout 164.

The control is conditioned for operation by turning start knob 141 to the on position to close contact 165 in FIG. V and place a suitable alternating current source across the main buses M and N. This also energizes the direct current circuits of FIG. VII through rectifier bridge 166 connected across buses M and N and having its output diagonal connected to buses G and H.

Initiation of the cycle is effected by depressing start button 145 to close contacts 167 at line 404 of FIG. VII. The operation of the system through a cycle automatically routes the several reset signals, actuates the feeds for appropriate materials and stops either for a deviation from tolerances or at the completion of the batch after the control has been set up on the face of the control panel, to batch the desired materials in the desired quantities. If the scale has completed its cycle and the batch has been discharged from the weighing station, relay K10 at line 339 is deenergized since zero switch 168 is open. At the first position of the stepping switch SP which selects the program steps, contact SP-1 at line 405 is open and at all other positions it is closed. The stepping switch SP is ratchet operated and advances on the dropout of its armature. It has an interrupter contact SP-2 at line 411.

Closure of start contact 167 energizes start relay K1 at line 404 from bus G through lead 169, contact 167, and back contact K10-1 of the zero switch relay to bus H. Contact K1-1 is closed at line 405 to cock the stepping switch SP by energizing its coil from bus G through lead 169, contact 167, back contact K10-1, lead 171, contact K1-1, stop contact 172 of stop push button 148, reset contact 173 of reset push button 149, lead 174, the first position of program selector deck SP-4 at line 429, "read" neon lamp 189, lead 170, back contacts SP-2 and K3-2 at line 411, the coil of relay K2 and bus H. When K2 pulls in, it energizes coil SP by closing contact K2-2 at line 408 from lead 174 to cock the ratchet drive for all of the SP decks. It also energizes timing relay K4 by closing contact K2-1 at line 45 to open back contact K4-1 at line 435, with no effect at this time. The energization of coil SP opens interrupter contact SP-2 at line 411 thereby deenergizing relay K2 which drops out after a suitable interval as determined by condenser 181. As K2 drops out it opens K2-2 to deenergize coil SP and permits the spring biased ratched drive to advance the contacts in each deck of the program selector and to close contact SP-1 which remains closed until the stepper is recycled to the first position. With SP-1 closed it is no longer necessary to maintain contact 167 closed and start button 145 can be released.

With the program stepper SP advanced to the second position each of its complete decks, SP-3, SP-4, and SP-5 of FIG. VII, SP-6 and SP-7 of FIG. VI, and SP-8 of FIG. V together with deck SP-9 portions of which SP-9' are shown in FIG. V and other portions of which SP-9" are shown in FIG. VII, have a bridging contact advanced. The advance of the contact in deck SP-9 completes an energizing circuit for material A selection relay KA at line 222 to close contact KA at line 214 whereby one of twenty material selection solenoids 178 is energized. The material to be batched as material A is predetermined by the setting of selector switches 176 and 177 for the tens and units levels respectively. Each switch is controlled by a knob on the control panel; thus, knob 143 is coupled to the arm of selector switch 176 and for material A is illustrated as set at the one level, and knob 144 is coupled to the arms of the two decks 177' and 177" and for material A is illustrated as set at the zero level. The illustrated setting is for material number ten to be fed as material A by energizing its material selection solenoid 178 at line 211 when contact KA is closed. Similar material selection switches (not shown) are provided for materials B and C and are effective on the seventh and twelfth steps of SP-9 to close energizing circuits for selection relays KB and KC at lines 223 and 224 respectively and close relay contact KB and KC to those switches at lines 217 and 220.

The energization of the tenth material selection solenoid 178 conditions the system to admit that material to the weighing station through suitable gates and ducts (not shown).

As explained above, the program selector deck in section 34 of FIG. I as shown in FIG. III establishes the appropriate reset to the complement of the nominal weight of material A for the second through fifth steps. The program selector deck in section 58 establishes the appropriate advance from the reset complement of the nominal weight of material A to the complement of the first cutoff for material A in response to the delay reset pulse when in the second position while the second position of the section 69 has no effect.

Advance of SP-8 to the second position at line 229 energizes first cutoff relay K6 from bus M through contact K1 at line 233, and second position of SP-8 to bus N. Relay K6 closes its contact at 337 to energize fast feed solenoid FF whereby the gates controlling the flow of material A are opened to permit fast feed thereof to the weighing station.

Program selector contacts of SP-6 and SP-7 controlling the indicator lamps also advance to the second position to energize fast feed indicator lamp 159 at line 304 and material A lamp 155 at line 324 respectively.

No effect is had as a result of the advance of SP-4 and SP-5 at this time assuming that switch 179A is open. The purpose of switches 179A, 179B and 179C is to enable the program selector step past the functions for the particular material as where only one or two materials are to be fed and checked by the system. The operation of these switches will be explained.

A circuit is now partially completed through the second position of program selector deck SP-3 at line 411. When the counter, starting from the complement of the first cutoff weight for material A, counts out, it energizes relay KCO of FIG. IV to close its contact between leads 136 and 137 at line 415 of FIG. VII. This completes an energizing circuit for program advance relay K2 from bus G through contact SP-1 at line 405, leads 174 and 136, contact KCO-1, lead 137, SP-3 position two at line 411, and back contacts SP-2 and K3-2 to bus H. Advance relay contact K2-2 at line 408 is closed to energize coil SP and cock the stepper. Advance relay contact K2-3 in FIG. IV closes to impose a negative bias on the control grid 138 of triode 133 thereby returning multivibrator 66 to its quiescent state and deenergizing relay KCO.

The stepping operation of SP is as described. Back contact SP-2 at line 411 is opened to deenergize relay K2 which drops out after a suitable delay as established by condenser 181 to open contact K2-2 and deenergize SP. On its dropout all of the SP decks are advanced to their next position.

In the third position the program stepper maintains the nominal reset, and establishes appropriate conditions for indicating slow feed of material A, initiates slow feed rate through energization of second cutoff relay K7 at line 235 through SP-8, adjusts the reset to cut off feeding at a point determined by the preact through program selector section 69 of FIG. I, and conditions the stepper circuit through SP-3 for advance to the minus tolerance check. Relay K7 closes contact K7-1 at line 338 to energize slow feed solenoid SF.

On the minus tolerance check the counter must cycle through zero and KCO must be actuated as in the preceding feed subcycles otherwise the system will not advance automatically. Timing relay K4 at line 445 limits the interval during which the minus tolerance can be checked. Each energization of relay K2 closes contact K2-1 to energize relay K4. Condenser 182 and rectifier 183 establish a decay interval for relay K4 and thus the delay in dropout. Relay K4 has a back contact K4-1 at line 435 which activates the minus tolerance and plus tolerance contacts of SP-4 for each material and the readout contacts for materials B and C to insure automatic advance within predetermined intervals where the system operates properly. On the minus tolerance automatic advance requires closure of contact KCO prior to the closure of back contact K4-1 since it is necessary that the stepper SP advance before the out of tolerance relay K3 at line 401 is energized to seal itself in through K3-1 and open the advance relay circuit at back contact K3-2 at line 411. Upon advance of stepper SP to the fourth position, relay K2 is dropped out and K4 begins to time out. The minus tolerance complement is preset in the counter as described and a scan is made. If the scan causes the counter to count out, relay KCO is energized to close its KCO-1 contact at line 415. This energizes K2 through the fourth position of SP-3 at line 413 to cock the stepper SP and reenergize relay K4. The stepper then advances to the fifth position indicating that the weight is within its minus tolerance.

If the minus tolerance is not attained by the closure of contact KCO before contact K4 closes, relay K3 is energized from bus G through contact K4-1 the fourth position of SP-4 at line 433, leads 184 and 185 to coil K3 at line 401. This indicates the load is out of tolerance by locking up the system at open contact K3-2.

The system can be advanced to the next step under these circumstances by depressing advance push button 147 to open its contact 186 at line 401 and close that contact at line 402. This drops out the holding circuit for relay K3, although the relay remains energized through SP-4. It also completes an energizing circuit for advance relay K2 from bus G through contacts SP-1, 173, 172, lead 187 and contact 186 to bus H. When K2 pulls in it cocks SP and permits the advance to occur while resetting relay K4 to deenergize relay K3.

In the plus tolerance check accomplished at the fifth, tenth and fifteenth positions of the program selector, K4 must time out before KCO closes in order for the program to be advanced automatically. In this instance this indicates that the weight is not above the upper limit as described above. As the stepper advances and the dropout time of K4 is initiated, that dropout time is increased by increasing the capacitance across its coil through the completion of the SP-9" circuit at line 440 to add condenser 188 in parallel with 182. The weight is scanned as outlined. If it does not exceed the tolerance, relay KCO is not energized. Contact K4-1 at line 435 closes as relay K4 drops out to complete a circuit through SP-4 position five at line 434 and contacts SP-2 and K3-2 for relay K2. The stepper then advances to the read position from which it again advances as K4 again drops out to reenergize K2 through the sixth position of SP-4 at line 435, neon lamp 189, and contacts SP-2 and K3-2.

If KCO is energized on a plus tolerance check, relay K3 is energized through the fifth position of SP-3 at line 414, and lead 185 to lock up the system as described. Advance can then be effected manually only by depressing push button 147 and the operator is made aware of an inaccurate batching cycle.

The system is designed to batch three materials by twice repeating the subcycles outlined in program selector steps seven through eleven for material B and twelve through fifteen and recycle to the first position for material C. However in some instances it is desirable to employ the automatic weigher and batcher for only one or two materials. If switch 179 B is closed to lead 189 the cycle for material B will be by-passed since advance relay will be energized each time stepper coil SP is dropped out. Thus at position seven of SP-5 a circuit will be completed from bus G through contact SP-1 lead 174, lead 191, SP-5 at line 423, contact 179B, lead 189 and contacts SP-2 and K3-2 to K2 and thence bus H. K2 will cock SP through contact K2-2. SP will open SP-2 to dropout K2 and break its own energizing circuit and the stepper will advance. However, the same circuit is re-established at the eighth position of SP-5 at line 424 and the stepper again advances to repeat the sequence for the ninth, tenth and eleventh steps.

Upon completion of the batching cycle the system is quiescent until the batch is discharged. Read lamp 164 is lighted through SP-6 at position one, line 301, zero switch relay contact K10-2 at line 202, and discharge relay back contact KD-2 at line 204. In order to unload the system, discharge button 146 is depressed to close contact 192 at line 226 and energize discharge relay KD which seals itself in at line 227 and lights discharge indicator lamp 158 at line 225 until the weighing station is completely unloaded and relay K10 drops out to open its contact K10-4 at line 226. Relay KD controls a discharge gate (not shown) from the weighing station. When K10 drops out, it closes back contact K10-3 to light "Cycle Complete" lamp 154 at line 301. The system is then prepared to perform another batching cycle upon the closure of start contact 173.

In recapitulation of the invention it comprises a computing combination wherein a digital readout is preceded by a start signal which resets a counter to the complement of a nominal value being considered. The start signal also generates a delayed signal which, in turn, generates a given number of pulses which are employed to preset the counter to some value deviating a given amount from the complement of the nominal value. The application of the pulse train following this preset in some instances causes the counter to recycle through zero indicating a correct operation and causing a programer to advance. In other instances it is desirable to avoid recycling the counter when it receives a full pulse train, a timer limits the interval in which the counter can be recycled and then advances the programer.

The system lends itself to subtraction from the reset complement of the nominal value by generating a pulse train $n$ pulses (10 pulses in the example) short of that representative of the quantity being measured. These 10 pulses represent ten tenths of a pound in the illustrative system and can be considered the equivalent of a single pulse applied to the units decade of the counter. In those cycles where the preset complement exceeds the nominal complement a compensating pulse is added to the units decade which effectively inserts the $n$ pulses (10 pulses in the tenths decade) in cycles where subtraction from the complement is required this compensating pulse is not added to the units decade, and the count remains $n$ pulses short of the quantity being measured. Plus tolerance, for example, may then be checked by inserting the $n$'s complement of the tolerance less one pulse (where $n$ and 10 and the tolerance is 2 by inserting seven pulses, $10-2-1=7$).

The programer is arranged to apply preset pulses in different numbers to at least two decades of the counter by selective processes which are implemented by selection switches so that much of the equipment is used in a number of the subcycles. Thus a number of nominal values are established in the reset process as determined by the programer and variations from those nominal values can be established by the preset signals.

While the programing of the present system has been disclosed as being performed by manual adjustment of selection switches and the automatic advancement of a stepping switch, it is to be understood that other techniques might be employed. For example, batching program can be set up on punch cards and a card reader employed to establish the program either as discrete steps as performed above by the stepping switches or in its entirety by establishing the various quantities which are preselected manually above and by performing the program advancing functions. Further, the multiple resetting techniques of this invention can be applied to other than weighing scales for establishing one or more values critically related to a nominal value with all of the advantages inherent in the present system. The particular combination of steps and the sequence of those steps illustrated in the batching system and the details of their controls can be altered within the spirit and scope of the invention. For example, only a single cutoff setting might be used for a multiplicity of materials so that all would cut off at the same weight in advance of their respective nominal weights either for one of the cutoffs or for both. Accordingly, it is to be appreciated that the above description is to be read as illustrative of the present invention and not in a limiting sense.

I claim:
1. A system for control of the flow of material, comprising means for controlling the initiating of material flow, a station at which the material is accumulated, means for respectively sensing the quantity of material accumulated at said station, means for generating a first electrical signal consisting of a plurality of pulses having a number which is a function of the quantity of material which is sensed, said pulses individually representing a unit measure of said material, means for generating a second electrical signal prior to said first signal, said first and second electrical signals being repetitively generated at a rate sufficient to produce at least one complete signal in each interval that a unit measure of said material flows, a counter for the pulses of said first signal, means for actuating a control for altering the rate of flow of material in response to the recycling of said counter, and means responsive to said second electrical signal for establishing in said counter a count which is the complement of a predetermined number of pulses prior to the insertion of the pulses of said first signal in said counter.

2. A system for control of a quantity of material, comprising a weighing station, means for controlling the initiation of material flow to said station, means for feeding material to said station, means for generating a train of electrical pulses repetitively in a number which is a function of the weight of material at said station, each of said pulses representing a unit of weight, means for generating a start pulse prior to each train of said weight pulses, said start and weight pulses having a repetition rate of generation such that at least one complete weight signal is generated in each time interval that the weight of material at said station changes by one of said units of weight, a pulse counter, means to reset the counter to the complement of a pulse count representative of a given weight in response to said start pulse, and means for actuating a control for altering the rate of feed of material in response to the recycling of said counter.

3. In combination, means to generate a train of electrical pulses, means to generate a start signal a given interval prior to the initiation of said train, means to generate a plurality of preset pulses in response to and subsequent to said start signal and prior to said train, a pulse counter, means to establish a given count in said counter in response to said start signal, means to apply a preset signal to said counter to alter said given count, means to selectively adjust the number of pulses represented by said preset signals and means to feed said pulse train to said counter.

4. A combination according to claim 3 wherein said counter comprises a plurality of decades, and said means to apply a preset signal is selectively adjustable to apply said signal to a selected decade of said counter.

5. A combination according to claim 3 wherein said counter comprises a plurality of decades, and said means to apply a preset signal applies said signal to a plurality of decades of said counter.

6. A combination according to claim 3 wherein said counter comprises a plurality of decades, and said means to apply a preset signal is selectively adjustable to apply a range of preset signals to a decade and to apply signals to a plurality of decades of said counter.

7. A measuring system comprising means to generate repetitively a train of electrical pulses representative of a quantity to be measured, means to generate a start signal prior to the initial pulse of each train, a pulse counter, means to establish a given count in said pulse counter in response to said start signal, means to apply said pulse train to said counter, and means responsive to a second given count in said counter for altering said start signal responsive means to establish a third given count in said counter in response to said start signal.

8. A measuring system comprising means to generate repetitively a train of electrical pulses representative of a quantity to be measured, means to generate a start signal prior to the initial pulse of each train, a pulse counter, means to establish a given count in said pulse counter in response to said start signal, means to apply said pulse train to said counter, timing means for establishing an interval, and means responsive to a predetermined condition in said counter during said interval for altering said start signal responsive means to establish a second given count in said counter in response to said start signal.

9. A measuring system comprising means to generate repetitively a train of electrical pulses representative of a quantity to be measured, means to generate a start signal prior to the initial pulse of each train, means to generate a second signal in response to said start signal, a pulse counter, means to establish a given count in said counter in response to said start signal, means to alter said count in said counter from said given count by a predetermined amount in response to said second signal, means to feed said pulse train to said counter, and means responsive to the condition in said counter as a result of the application of said pulse train for altering said means responsive to said second signal to alter said count in said counter from said given count by a second predetermined amount in response to said second signal.

10. A measuring system comprising means to generate repetitively a train of electrical pulses representative of a quantity to be measured, means to generate a start signal prior to the initial pulse of each train, means to generate a second signal in response to said start signal, a pulse counter, means to establish a given count in said counter in response to said start signal, means to alter said count in said counter from said given count by a predetermined amount in response to said second signal, means to feed said pulse train to said counter, and means responsive to the recycling of said counter to zero for altering said means responsive to said second signal to alter said count in said counter from said given count by a second predetermined amount in response to said second signal.

11. A measuring system comprising means to generate repetitively a train of electrical pulses representative of a quantity to be measured, means to generate a start signal prior to the initial pulse of each train, means to generate a second signal in response to said start signal, a pulse counter, means to establish a given count in said counter in response to said start signal, means to alter said count in said counter from said given count by a predetermined amount in response to said second signal, means to feed said pulse train to said counter, a timer for defining an interval, and means responsive to the expiration of said interval prior to the recycling of said counter to zero for altering said means responsive to said second signal to alter said count in said counter from said given count by a second predetermined amount in response to said second signal.

12. A weighing system comprising a weighing station, means to generate pulse signals repetitively, said signals including a train of pulses the length of which is a function of weight at the weighing station and including a start signal generated an interval prior to the first pulse of the train, means responsive to the start signal to generate a preset signal a given interval after the start signal and prior to the first pulse of the train, a pulse counter, means responsive to a start signal for establishing the complement of a nominal weight in said counter, means responsive to the preset signal for altering the count in said counter from the complement, a programer for changing the count change by said preset signal responsive count altering means, and means responsive to the recycling of said counter for actuating said programer.

13. A combination according to claim 12 including means feeding material to said weighing station and control means for altering the material feed in response to the recycling of said counter.

14. A weighing system comprising a weighing station, means to generate pulse signals repetitively, said signals including a train of pulses the length of which is a function of weight at the weighing station and including a start signal generated an interval prior to the first pulse of the train, means responsive to the start signal to generate a preset signal a given interval after the start signal and prior to the first pulse of the train, a pulse counter, means responsive to a start signal for establishing the complement of a nominal weight in said counter, means responsive to the preset signal for altering the count in said counter from the complement, a programer for changing the count change by said preset signal responsive count altering means, means responsive to the condition of said counter at the end of said train for controlling said programer, a timer for defining an interval from the preceding actuation of said programer, and means to actuate said programer at the end of said interval when said counter has not been recycled.

15. A weighing system comprising a weighing station, means to generate pulse signals repetitively, said signals including a train of pulses the length of which is a function of weight at the weighing station and including a start signal generated an internal prior to the first pulse of the train, means responsive to the start signal to generate a preset signal a given interval after the start signal and prior to the first pulse of the train, a pulse counter, means responsive to a start signal for establishing the complement of a nominal weight in said counter, means responsive to the preset signal for altering the count in said counter from the complement, a programer for changing the count change by said preset signal responsive count altering means, means responsive to the recycling of said counter for actuating said programer from a first to a second condition, a timer for defining an interval from the actuation of said programmer to said second condition, and means to actuate said programer to a third condition at the end of said interval when said counter has not been recycled during said interval.

16. A system for defining the limits of deviation from a value which comprises means for generating a pulse train having a number of pulses representative of the value less $n$ pulses, a pulse counter, means for setting the counter to the complement of the number of pulses representative of the value, means for adding to the complement in the counter effectively $n$ pulses and a number of pulses representative of the limit of negative deviation, means for transmitting the pulse train to the counter, a programer, means responsive to the recycling of the counter to advance the programer from a first to a second state, means for setting the counter to the complement of the number of pulses representative of the value while the programer is in the second state, means for adding to the complement in the counter the $n$'s complement of the limit of positive deviation less one while the programer is in the second state, means to apply the pulse train to the counter while the programer is in the second state, a timer for defining an interval from the advance of the programer, and means responsive to the termination of said interval prior to the recycling of said counter to zero.

17. A system for defining the limits of deviation from a value which comprises means for generating a pulse train having a number of pulses representative of the value less $n$ pulses, a pulse counter, means for setting the counter to the complement of the number of pulses representative of the value, means for establishing one state in the system for checking lower limits of the value and for establishing another state for checking upper limits of the value, means effective while the system is in the one state for adding to the complement in the counter effectively $n$ pulses and a number of pulses representative of the limit of negative deviation, means effective while the system is in the other state for adding to the complement in the counter a number of pulses which is the $n$'s complement of the limit of positive deviation less one, means to apply the pulse train to the counter subsequent to the addition of pulses, and means responsive to the number of pulses accumulated in the counter.

18. A system for feeding and checking a predetermined weight of material comprising a weighing station, means to control the flow of material to the weighing station, means to generate repetitively a train of electrical pulses representative of the predetermined weight less $n$ pulses, a programer, a pulse counter, means to generate a start signal prior to each pulse train, means to generate a plurality of preset pulses in response to said start signal and prior to each pulse train, means to establish the complement of the count representative of said predetermined weight in said counter in response to said start signal, means to add preset pulses and effectively to add $n$ pulses to said counter to establish the complement of the number of pulses generated at the appropriate weight cutoff point, means to feed the train of pulses to the counter, means responsive to the recycling of the counter to zero for actuating a material flow cutoff control and for actuating said programer to advance said system from a first to a second state where minus weight tolerance is checked, means to add preset pulses representative of the minus tolerance and effectively add $n$ pulses to the complement of the count representative of said predetermined weight in said counter while in said second state to establish the complement of the minimum weight, means to feed the train of pulses to the counter while in said second state, means responsive to the recycling of the counter to zero for actuating said programer to advance said system from said second state to a third state where plus weight tolerance is checked, means to add preset pulses which are the $n$ complement less one of the count representative of said plus tolerance weight in said counter while in said third state to establish the complement of the maximum weight, means to feed the train of pulses to the counter while in said third state, and means responsive to the failure of said counter to recycle to zero for indicating that the weight is within plus tolerances.

References Cited in the file of this patent

UNITED STATES PATENTS

| | | |
|---|---|---|
| 2,398,150 | Mumma | Apr. 9, 1946 |
| 2,403,873 | Mumma | July 9, 1946 |
| 2,669,388 | Fox | Feb. 16, 1954 |
| 2,803,448 | Biebel | Aug. 20, 1957 |

FOREIGN PATENTS

| | | |
|---|---|---|
| 771,052 | Great Britain | Mar. 27, 1957 |

UNITED STATES PATENT OFFICE
CERTIFICATE OF CORRECTION

Patent No. 3,035,648            May 22, 1962

Roger B. Williams, Jr.

It is hereby certified that error appears in the above numbered patent requiring correction and that the said Letters Patent should read as corrected below.

Column 3, line 28, for "plug" read -- plus --; column 4, line 69, for "weight" read -- weigh --; line 75, for "weights" read -- weighs --; column 10, line 31, for "92" read -- 93 --; line 57, for "position" read -- positions --; column 12, line 4, after "actuates" strike out "the"; line 38, for "ratched" read -- ratchet --; column 13, line 24, after "selector" insert -- to --; column 16, line 10, for "respectively" read -- repetitively --; column 18, line 30, for "internal" read -- interval --; line 42, for "programmer" read -- programer --.

Signed and sealed this 2nd day of April 1963.

(SEAL)

Attest:

ESTON G. JOHNSON            DAVID L. LADD

Attesting Officer            Commissioner of Patents